(12) United States Patent
Ernst

(10) Patent No.: US 10,660,306 B2
(45) Date of Patent: May 26, 2020

(54) DEVICE FOR SECURING FEED OR WATER BUCKET

(71) Applicants: Dylan Ernst, Eagle Creek, OR (US); Rebekah Ernst, Eagle Creek, OR (US)

(72) Inventor: Dylan Ernst, Eagle Creek, OR (US)

(73) Assignees: Dylan Ernst, Eagle Creek, OR (US); Rebekah Ernst, Eagle Creek, OR (US)

( * ) Notice: Subject to any disclaimer, the term of this patent is extended or adjusted under 35 U.S.C. 154(b) by 0 days.

(21) Appl. No.: 16/044,103

(22) Filed: Jul. 24, 2018

(65) Prior Publication Data

US 2019/0059320 A1    Feb. 28, 2019

Related U.S. Application Data

(60) Provisional application No. 62/539,331, filed on Jul. 31, 2017.

(51) Int. Cl.
*A01K 5/01*    (2006.01)
*A01K 7/00*    (2006.01)
*F16M 13/02*    (2006.01)

(52) U.S. Cl.
CPC ............ *A01K 5/0135* (2013.01); *A01K 7/005* (2013.01); *F16M 13/02* (2013.01)

(58) Field of Classification Search
CPC ...... A01K 5/0135; A01K 7/005; F16M 13/02; E06C 7/14; E06C 7/143; E06C 7/146
See application file for complete search history.

(56) References Cited

U.S. PATENT DOCUMENTS

| | | | | |
|---|---|---|---|---|
| 4,452,415 A | * | 6/1984 | Arnold | A47J 47/16 248/312.1 |
| 5,779,206 A | * | 7/1998 | Harris | A47B 96/06 248/214 |
| 6,102,349 A | * | 8/2000 | Hall | A01K 5/01 220/481 |
| 7,201,355 B1 | | 4/2007 | Zien et al. | |

* cited by examiner

*Primary Examiner* — Christopher Garft
(74) *Attorney, Agent, or Firm* — patenttm.us; James Walters

(57) ABSTRACT

A device for securing feed or water bucket includes a hook for receiving the bail of a bucket and a support for engaging the lip of the bucket. The device locks the bucket in position so that a horse or other animal is prevented from accidentally knocking the bucket off.

17 Claims, 5 Drawing Sheets

DEVICE FOR SECURING FEED OR WATER BUCKET

CROSS-REFERENCE TO RELATED APPLICATIONS

This application claims benefit of U.S. provisional patent application Ser. No. 62/539,331 filed Jul. 31, 2017, entitled DEVICE FOR SECURING FEED OR WATER BUCKET, the disclosure of which is incorporated herein by reference.

BACKGROUND

This disclosure relates to care of animals and more particularly to a device for securing a feed or water bucket or pail to prevent it from being knocked off by a horse or other livestock.

Owners of horses and other similar animals often provide water or feed for the horse in a stall by providing a bucket for the horse to drink or eat from. A typical bucket has Placing the bucket on the ground is problematic, as the horse can easily knock the bucket over, leaving the animal without water or food until a person returns to refill the bucket. To address this, wall mounted holders have been devised, such as a hanging a bucket in the stall at a suitable height so the horse can easily drink/eat from the bucket, while preventing the bucket from being knocked over. One such solution uses a metal frame that mounts to the wall and provides a shelf to hold the bucket, and side wall bumpers and an upper level rim to make it hard for the horse to dislodge the bucket. Such holders require substantial support for mounting, and could injure the horse if the horse runs into the metal frame.

More economical is to provide a bracket to hang the bucket from the wall. However, it is typical for the horse to knock the bucket off the bracket.

U.S. Pat. No. 4,452,415 provides a upper hook to hang the bail of the bucket on, and a lower L shaped bracket that the edge of the bucket rests on for support. A sliding lock is lowered to engage the upper lip of the bucket, tightened by a wing nut to secure it. The bail of the bucket is held in the hook by a clasp member that allows the bail to slide in easily, but which is more difficult to unlock for removing the bail when it is time to change the bucket. A user must simultaneously use 2 hands to remove the bucket, one hand to move the clasp to an open position while the other hand moves the bail away from the hook before the clasp is allowed to close again.

U.S. Pat. No. 7,201,355 provides a locking feature to lock the bail in place, by providing a vertically movable rod that the bail is placed behind by lifting the rod, moving the bail into position back of the space that the rod occupied, and then lowering the rod. Thus the rod acts as both a hook to hold the bail and a lock to keep the horse from locking the bail loose. Using this device requires that 2 hands be used to mount the bucket, holding the bail in position against the back wall of the device with one hand while raising and lowering the rod with another hand to secure and lock the bail to the device. If the bucket is already full with water, this operation becomes more difficult as the bucket will be very heavy and harder to hold in position while operating the bail securement/lock rod.

SUMMARY

In accordance with the disclosure, an easy to operate mounting and locking member for hanging a water/feed bucket for a horse or other animal is provided. The device is suitably configured as a 2 part member, with a base that is mounted to the wall and a sliding lock portion that removably secures the bucket and bail to the wall.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

DETAILED DESCRIPTION

The system according to a preferred embodiment of the present disclosure comprises a 2 part device that includes a mounting portion for mounting to a wall and a sliding portion that interlocks with the mounting portion and slides between an open position that allows a bucket to be mounted or dismounted, and a locked position that secures the bucket to prevent it from being knocked off by the horse.

Figure 1:
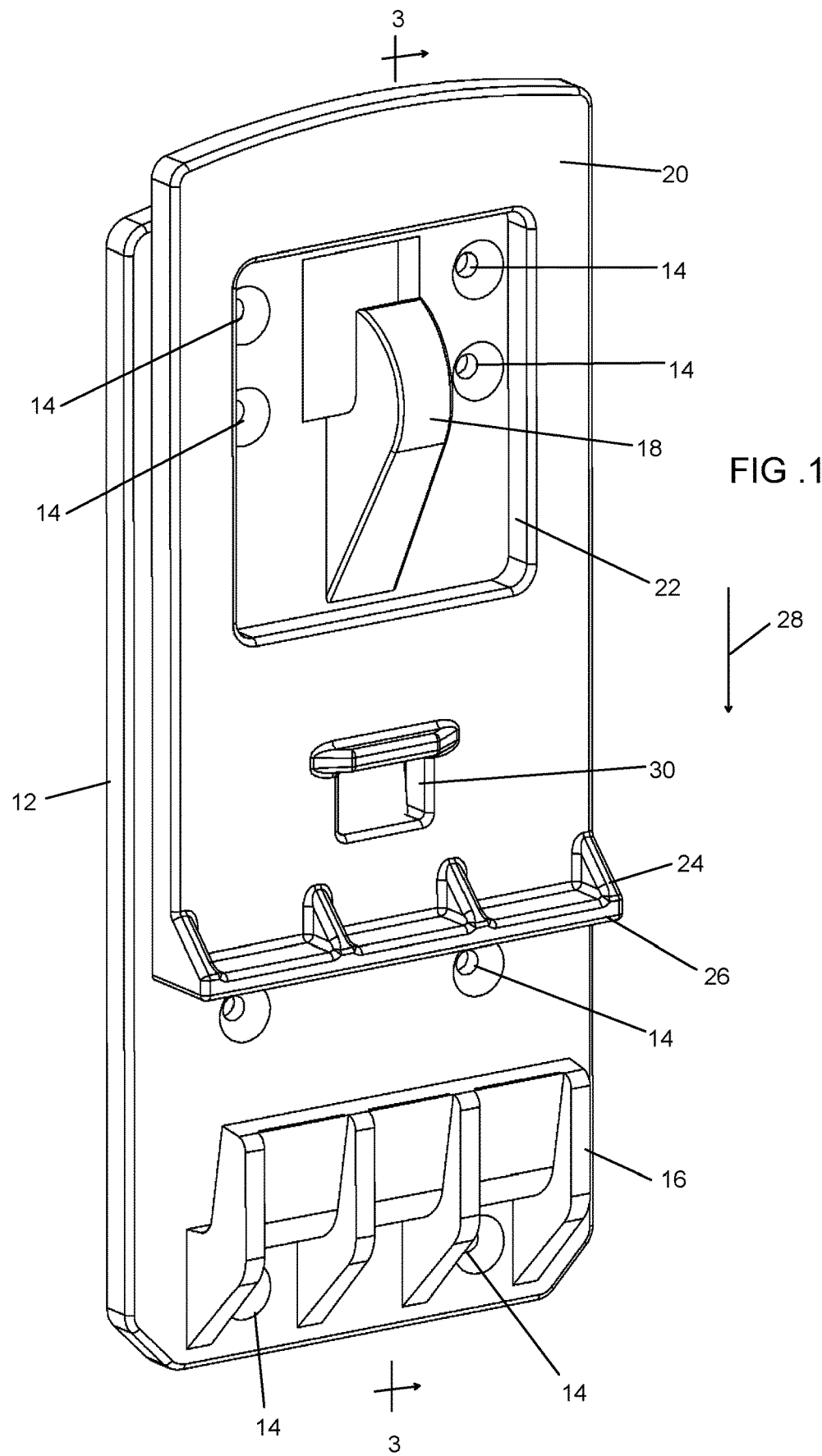
FIG. 1 is a perspective view of the bucket mounting/securing device of the disclosure in the unlocked position.

Referring to FIG. 1, a perspective view of the bucket mounting/securing device of the disclosure in the unlocked position, the device 10 comprises a rear mounting plate 12, which is suitably rectangular in overall form in the illustrated embodiment. The mounting plate 12 has plural recesses 14 defined therein to receive mounting screws, nails, bolts, etc., for example, so that the bracket can be secured to a wall in the horse's stall. A bucket lip receiving member 16 is positioned near the bottom end of the plate, adapted to engage with the inner portion of the bucket lip. Buckets designed for this use typically have a flat edge defined so that the bucket can engage a bucket lip receiving member, whether prior art types or the bucket lip receiving member of the present disclosure.

A bucket bail hook 18 is defined toward the upper end of the bracket, providing an upward oriented hook member that the bail of the bucket can be hung over.

Mounted to the front face of the plate 12 is a sliding lock plate 20, which is approximately ¾ the length of plate 12, and includes a hook opening 22 that allows the hook to protrude outwardly from plate 12, beyond the plane of member 20, while allowing access to the hook. At the bottom of member 20 is a lock shelf 24 that provides a bottom surface 26 adapted to engage with the top of the bucket rim when in a closed position. The position illustrated in FIG. 1 is the open position. The sliding lock plate further includes a latch opening 30, which interacts with a latch member discussed hereinbelow to provide a locking function to allow the device to be locked in the closed position.

Figure 2:
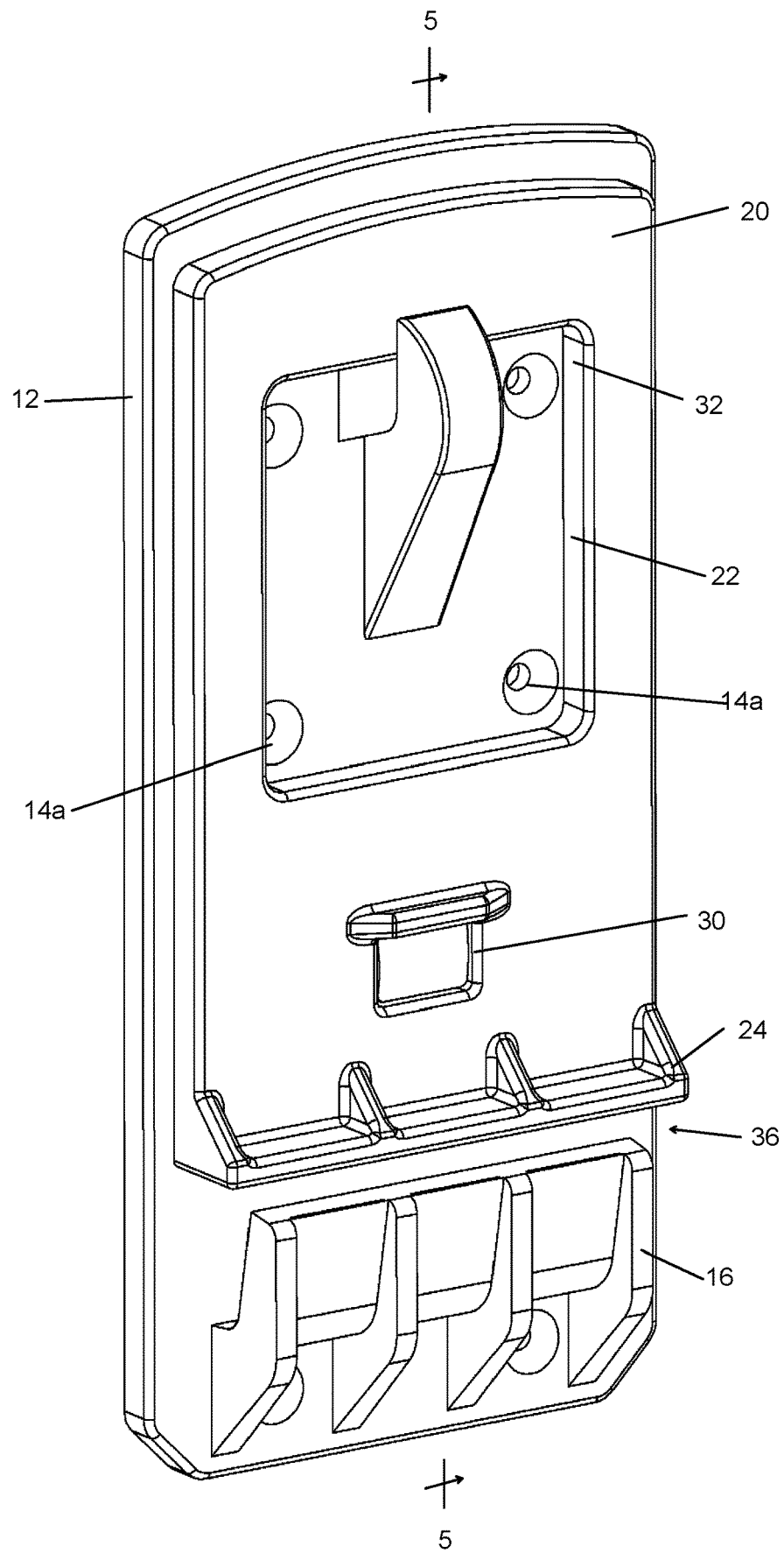
FIG. 2 is a perspective view of the bucket mounting/securing device of the disclosure in the closed and locked position.

The sliding lock member is constructed to interact with the plate 12 to allow the lock member to slide downwardly in the direction of arrow 28 in FIG. 1. When so moved downwardly from the configuration of FIG. 1, the result is illustrated in FIG. 2, a perspective view of the bucket mounting/securing device of the disclosure in the closed and locked position. In this view, the plate 20 has moved downwardly such that the upper edge 32 of hook opening 22 has moved to be below the upper edge of bucket bail hook 18. This will function to lock the bail of the bucket in the space 34 behind the protruding portion of the hook. This prevents the bail from being accidentally knocked out of engagement with the hook by the horse.

Further, with the movement of the sliding lock plate 20 downwardly, the lock shelf 24 has moved down, defining a space 36 between the bottom face 26 and the upper edge of bucket lip receiving member 16. The dimensions of this space are defined such that a secure engagement is made with the lip of the bucket, securing the bucket in place.

Additional mounting holes 14a are visible in FIG. 2, which were blocked from view in FIG. 1

Figure 3:
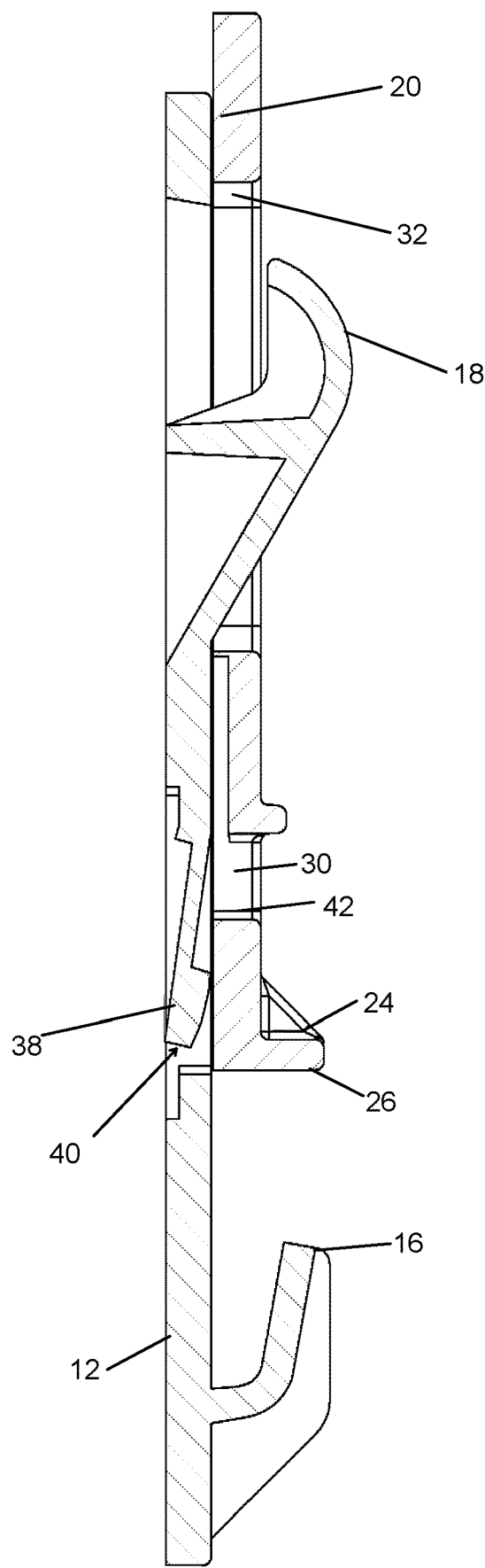
FIG. 3 is a sectional view of the bucket mounting/securing device taken along line 3-3 of FIG. 1.

Referring now to FIG. 3, a sectional view of the bucket mounting/securing device taken along line 3-3 of FIG. 1, the locking feature that allows the device to be locked in the close position will be described. Plate 12 includes a spring loaded latch member 38 in a position such that when plate 20 is moved to the closed position, the spring loaded latch member 38 will snap into the space defined by latch opening 30. In the view of FIG. 3, the latch member 38 is pushed rearwardly by the latch member riding on the back surface of sliding lock member 20. But, once the lock member 20 is moved to the closed position, the latch member is free to move forwardly into the space defined by latch opening 30. The lower face 40 then is engaged with the lower face 42 of opening 30, which latches the plate 20 into the closed position. With this, the horse is unable to accidentally push the plate 20 upwardly, so the bucket remains secured.

Figure 4:
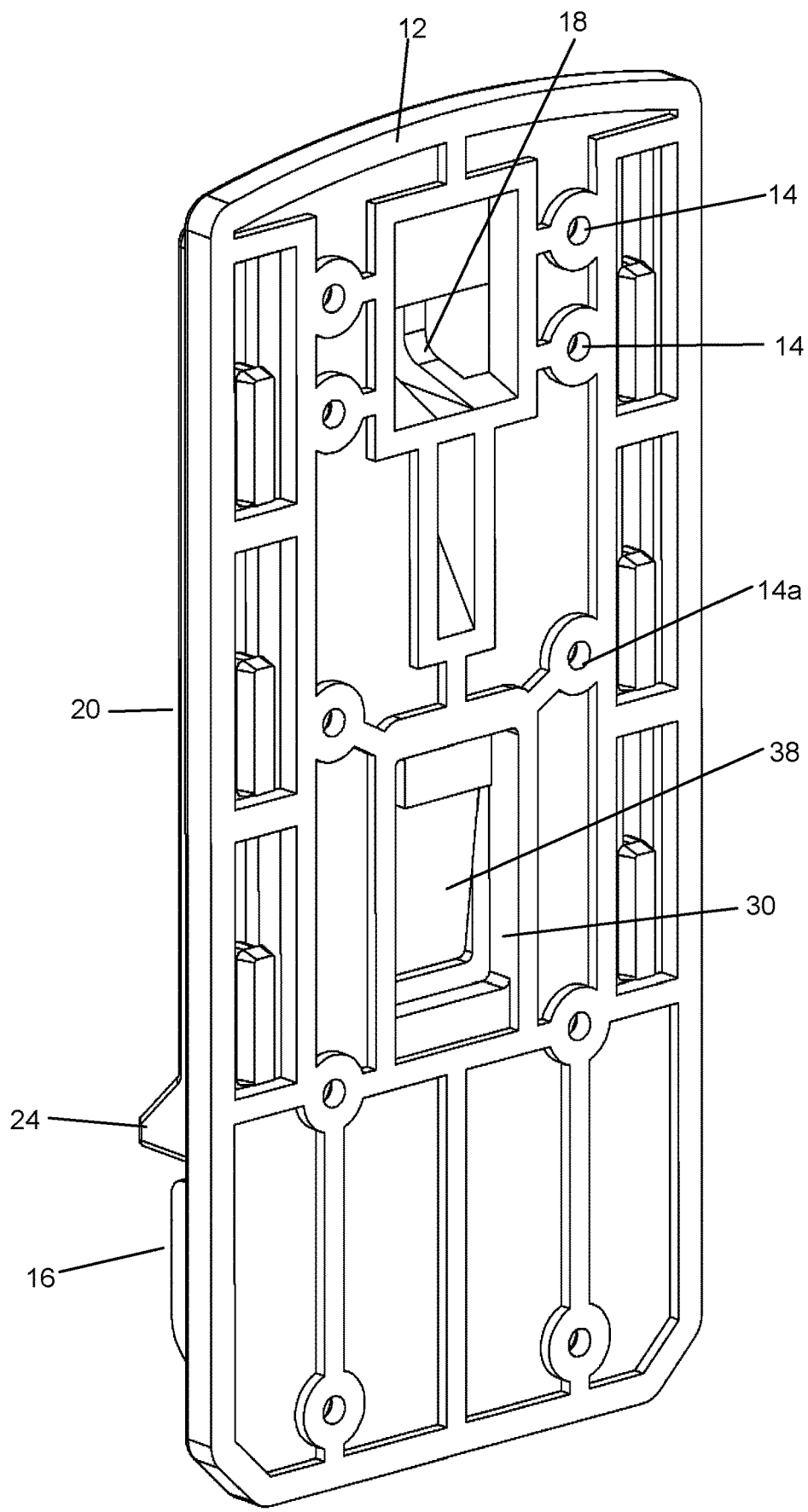
FIG. 4 is a rear view of the bucket mounting/securing device.

FIG. 4 is a rear view of the bucket mounting/securing device with the latch 38 in the latched position.

Figure 5:
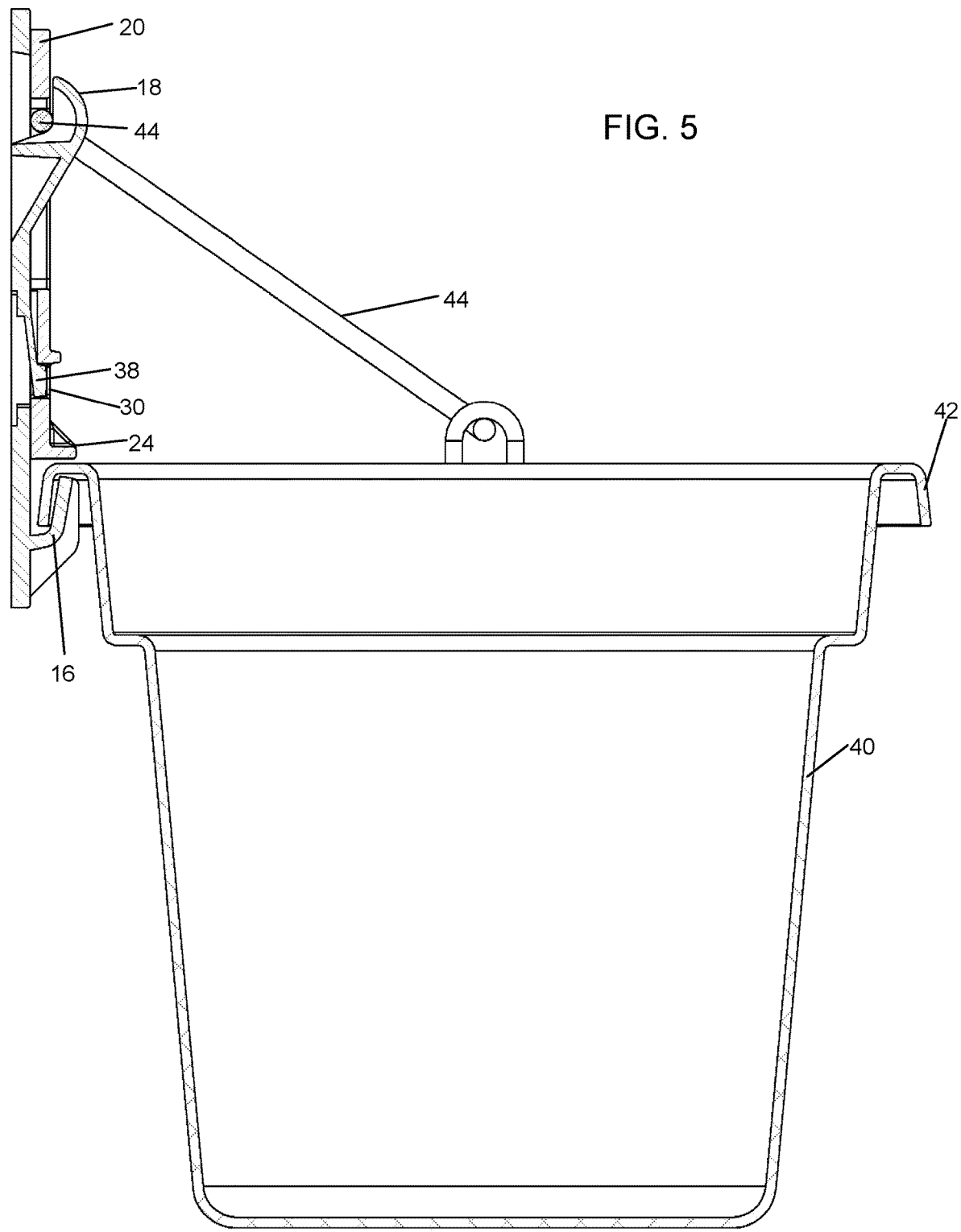
FIG. 5 is a sectional view of the bucket mounting/securing device taken along line 5-5 of FIG. 2, with the addition of a bucket mounted thereto.

FIG. 5 is a sectional view of the bucket mounting/securing device taken along line 5-5 of FIG. 2, with the addition of a bucket mounted thereto. The bucket 40 is positioned so that the lip 42 of the bucket fits over and behind bucket lip receiving member 16, and bail 44 is fit over hook 18. The plate 20 locks the bail in position over the hook, and latch 38 is moved forwardly into latch opening 30, locking the bucket in place. To remove the bucket, latch member 38 is depressed in the direction of arrow 46, to disengage it from latch opening 30, and plate 20 is then moved upwardly, freeing the bail and bucket lip from their locked positions, which allows the bucket to be removed for replacement, cleaning, etc.

The device is suitably capable of being manufactured from a number of substances, metal, plastics, whether molded, injection molded, milled or other suitable manufacturing processes.

In accordance with the above, an improved bucket holder is provided that is easily operated and allows owners of horses or other animals to provide unattended water or feed buckets with considerably lessened likelihood that the horse will be able to knock the bucket loose.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

The invention claimed is:

1. A support bracket for a bucket, comprising:
   a base adapted for mounting to a support;
   a bail engager for receiving and supporting a bail of the bucket;
   a lip engager for receiving and supporting a lip of the bucket; and
   a sliding lock member adapted to slide to simultaneously lock the bail to the bail engager, and lock the lip to the lip engager,
   wherein said sliding lock member comprises an opening for said bail engager to pass therethrough, and an edge of said opening acts to lock said bail from removal from said bail engager when said sliding lock member is moved to a lock position.

2. The support bracket according to claim 1, further comprising a latch to lock the sliding lock member in a locked position.

3. The support bracket according to claim 2, wherein the latch includes a spring loaded member that interacts with an opening in the sliding lock member to lock the sliding lock member in the locked position.

4. The support bracket according to claim 2, wherein the latch is depressible to release the sliding lock member from the locked position.

5. The support bracket according to claim 1, wherein said base comprises plural mounting holes for receiving a fastener therein for mounting.

6. The support bracket according to claim 1, wherein said sliding lock member comprises a unitary member and provides a first locking zone for locking the bail to the bail engager and a second zone for locking the lip to the lip engager.

7. A support bracket for a bucket, comprising:
   a base adapted for mounting to a support;
   a bail engager for receiving and supporting a bail of the bucket;
   a lip engager for receiving and supporting a lip of the bucket; and
   a sliding lock member adapted to slide to simultaneously lock the bail to the bail engager, and lock the lip to the lip engager,
   wherein said bail engager comprises a hook member and said sliding lock member comprises an opening for said hook member to pass therethrough, and an edge of said opening acts to lock said bail from removal from said hook member when engaged by the hook.

8. The support bracket according to claim 7, further comprising a latch to lock the sliding lock member in a locked position.

9. The support bracket according to claim 7, wherein the latch includes a spring loaded member that interacts with an opening in the sliding lock member to lock the sliding lock member in the locked position.

10. The support bracket according to claim 7, wherein the latch depresses to release the sliding lock member from the locked position.

11. A mounting bracket for supporting a feed or water pail for an animal in a stall, said feed or water pail comprising a bail and a rim, comprising:
    a mounting plate for fixing the mounting bracket to a portion of the stall; and
    a sliding lock plate for selectively locking or unlocking the feed or water pail against accidental dislodging from the mounting bracket by said sliding lock plate preventing or allowing removal of both said bail and said rim, wherein said sliding lock plate comprises an opening for a bail engager to pass therethrough, and an edge of said opening acts to lock said bail from removal from said bail engager when said sliding lock plate is moved to a lock position.

12. The mounting bracket according to claim 11, further comprising a bail receiver for engaging with the bail of the pail.

13. The mounting bracket according to claim 11, further comprising a rim receiver for engaging with the rim of the pail.

14. The mounting bracket according to claim 11, wherein the sliding lock plate locks the bail of the pail and the rim of the pail into secure engagement with the mounting bracket when in a locked position.

15. The mounting bracket according to claim 11, further comprising:
- a bail receiver for engaging with a bail of the pail; and
- a rim receiver for engaging with a rim of the pail,
- wherein a first portion of the sliding lock plate locks the bail of the pail and a second portion of the sliding plate locks the rim of the pail into secure engagement with the mounting bracket when in a locked position.

16. The mounting bracket according to claim 11, wherein said sliding lock plate comprises a unitary member and provides a first locking zone for locking the bail and a second zone for locking the rim.

17. A mounting bracket for supporting a feed or water pail for an animal in a stall, said feed or water pail comprising a bail and a rim, comprising:
- a mounting plate for fixing the mounting bracket to a portion of the stall; and
- a sliding lock plate for selectively locking or unlocking the feed or water pail against accidental dislodging from the mounting bracket by said sliding lock plate preventing or allowing removal of both said bail and said rim,
- comprising a bail engager and said sliding lock plate comprises an opening for said bail engager to pass therethrough, and an edge of said opening acts to lock said bail from removal from said bail engager when engaged by the bail engager.

\* \* \* \* \*